United States Patent

Benner

[11] Patent Number: 5,961,659
[45] Date of Patent: *Oct. 5, 1999

[54] INDEPENDENT SIMULTANEOUS QUEUEING OF MESSAGE DESCRIPTORS

[75] Inventor: Alan Frederic Benner, Poughkeepsie, N.Y.

[73] Assignee: International Business Machines Corporation, Armonk, N.Y.

[ * ] Notice: This patent is subject to a terminal disclaimer.

[21] Appl. No.: 08/884,737

[22] Filed: Jun. 30, 1997

[51] Int. Cl.[6] ........................................................ H04L 1/18
[52] U.S. Cl. ................................ 714/749; 710/52; 710/54
[58] Field of Search ...................... 371/33; 395/200.67, 395/200.49, 200.32, 200.57, 200.33, 200.51, 500.01, 568, 569, 677, 680, 683, 825, 872, 846, 874, 500.1; 703/8, 103; 379/88.07, 88.08, 88.01, 88.25, 211

[56] References Cited

U.S. PATENT DOCUMENTS

| | | | |
|---|---|---|---|
| 4,829,425 | 5/1989 | Bain, Jr. et al. | 364/200 |
| 5,027,316 | 6/1991 | Frantz et al. | 364/900 |
| 5,170,480 | 12/1992 | Mohan et al. | 395/600 |
| 5,212,778 | 5/1993 | Dally et al. | 395/400 |
| 5,218,680 | 6/1993 | Farrell et al. | 395/325 |
| 5,260,933 | 11/1993 | Rouse | 370/14 |
| 5,347,632 | 9/1994 | Filepp et al. | 395/200 |
| 5,392,396 | 2/1995 | MacInnis | 395/164 |
| 5,511,165 | 4/1996 | Brady et al. | 395/200.01 |
| 5,511,166 | 4/1996 | Travaglio et al. | 395/200.2 |
| 5,513,320 | 4/1996 | Young et al. | 395/200.01 |
| 5,761,511 | 6/1998 | Gibbons et al. | 395/705 |

OTHER PUBLICATIONS

M.J. Corrigan, W.A. Kirke, L.A. McMahon, R.A. Petrillo and J.J. Vriezen, "Queuing Functions on 65–Bit Multiprocessors when Requested Queue is Busy," IBM Technical Disclosure Bulletin, vol. 37, No. 12, pp. 535–538 (Dec. 1994).

Primary Examiner—William Grant
Assistant Examiner—McDieunel Marc
Attorney, Agent, or Firm—Heslin & Rothenberg, P.C.; Floyd A. Gonzalez, Esq.

[57] ABSTRACT

Two independent pointers within a message descriptor are used to link the message descriptor to various queues during transmission of a message from a sender node to a receiver node within a computer environment. In particular, one pointer is used to link the message descriptor on either a pending send queue or a send queue, while the other pointer is used to link the message descriptor on either an unacknowledged queue or an acknowledged queue. For example, when a message is sent, it is removed from the send queue using one pointer and placed on the unacknowledged queue using the other pointer. Further, if the message is resent, it is linked back onto the send queue using the send queue pointer without disturbing the order of the message on the unacknowledged queue. Thus, ordering of message transmission is preserved, even when a message is sent multiple times.

15 Claims, 9 Drawing Sheets

INDEPENDENT SIMULTANEOUS QUEUEING OF MESSAGE DESCRIPTORS

CROSS REFERENCE TO RELATED APPLICATION

This application contains subject matter which is related to the subject matter of the following application, which is assigned to the same assignee as this application and filed on the same day as this application. The below listed application is hereby incorporated herein by reference in its entirety:

"METHOD OF INDEPENDENT SIMULTANEOUS QUEUEING OF MESSAGE DESCRIPTORS," by Alan F. Benner, Ser. No. 08/884,974 (Docket No. PO9-96-115).

TECHNICAL FIELD

This invention relates, in general, to the transmission of messages within a computer environment and, in particular, to the independent, simultaneous queueing of message descriptors during the transmission and/or retransmission of messages.

BACKGROUND ART

In a typical parallel computer environment, multiple, independent computing nodes communicate with one another over an interconnection network. In particular, messages are sent from one node to another node within the computer environment via the interconnection network.

During message transmission, it is possible for a message to be lost due to, for instance, an error within the network, a busy condition, a disconnected cable, or mechanical failure on the line. However, for proper operation within the computer environment, it is imperative that a destination node receive any messages intended for the node. Thus, to ensure that the sender of a message knows whether or not the destination node has received the message, the destination node sends back an acknowledgement to the sender when it has received the message. If the sender does not receive an acknowledgement at the appropriate time, then the sender knows that the message has not been received.

When an acknowledgement has not been received, then the message is retransmitted to the destination node. However, in certain environments, it is necessary to maintain the sequential order of the messages. That is, the acknowledgements must be in the same sequence as the transmissions. Thus, when an unacknowledged message is retransmitted, any other messages sent thereafter are also retransmitted. This is to allow the messages to be acknowledged in the proper order.

A need exists for an improved capability to track transmission of messages and acknowledgements to those messages. A further need exists for an improved capability that achieves correct sequentiality and preserves ordering of message transmission, even when messages must be sent multiple times to recover from transmission errors.

SUMMARY OF THE INVENTION

The shortcomings of the prior art are overcome and additional advantages are provided through the provision of a memory including a descriptor stored in the memory for use in sending messages. The descriptor includes a first pointer usable in linking a message on one of a first data structure and a second data structure; and a second pointer usable in linking the message on one of a third data structure and a fourth data structure.

In yet another aspect of the present invention, a system of sending messages within a computer environment is provided. A sender of the computer environment is adapted to send a message to a receiver of the computer environment. The sender includes at least one hardware element being adapted to remove a descriptor of the message from a first data structure using a first pointer of the descriptor, and to append the descriptor to a second data structure using a second pointer of the descriptor. The first and second pointers are independent of one another.

In one embodiment, the at least one hardware element is adapted to append by being further adapted to set the second pointer of the descriptor to null indicating the descriptor is currently the last element of the second data structure; and to update the second pointer of a previous descriptor appended to the second data structure, if the previous descriptor exists, to reflect that the descriptor being appended is the next linked element to the previous descriptor.

In a further embodiment, the sender is further adapted to receive an acknowledgement from the receiver indicating receipt of the message. In one example, the sender comprises at least one hardware element used in receiving the acknowledgement. The at least one hardware element is adapted to remove the descriptor from the second data structure and to append the descriptor to a third data structure using the second pointer.

In yet a further embodiment, the sender is further adapted to resend the message from the sender to the receiver. The resend includes appending the descriptor to the first data structure using the first pointer, such that the descriptor also remains on the second data structure and ordering of the descriptor on the second data structure is maintained.

In another aspect of the present invention, a system of queueing messages within a computer environment is provided. The system includes a first pointer of a message descriptor adapted to link the message descriptor to a first data structure; and a second pointer of the message descriptor adapted to link the message descriptor to a second data structure. The first and second pointers are independent of one another, and the message descriptor is appended to both the first data structure and the second data structure for a certain amount of time.

The capabilities of the present invention advantageously incorporate two independent linking pointers in each message descriptor. Thus, a message descriptor can concurrently be placed on two independent queues. This is important to achieve correct sequentiality and to preserve ordering of message transmission, even when messages are resent multiple times to recover from transmission errors. In addition to the above, the capabilities of the present invention allow the processes or functions of the present invention to be pipelined for better performance.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, each message to be transmitted from one node within a computer environment to another node within the environment includes a message descriptor. Each message descriptor advantageously includes two independent linking pointers that can be used to link the message (and in particular, the message descriptor) onto two independent queues. The two linking pointers are used to preserve the ordering (e.g., correct sequentiality) of message transmission, even when one or more messages need to be sent multiple times to recover from transmission errors.

Figure 1:
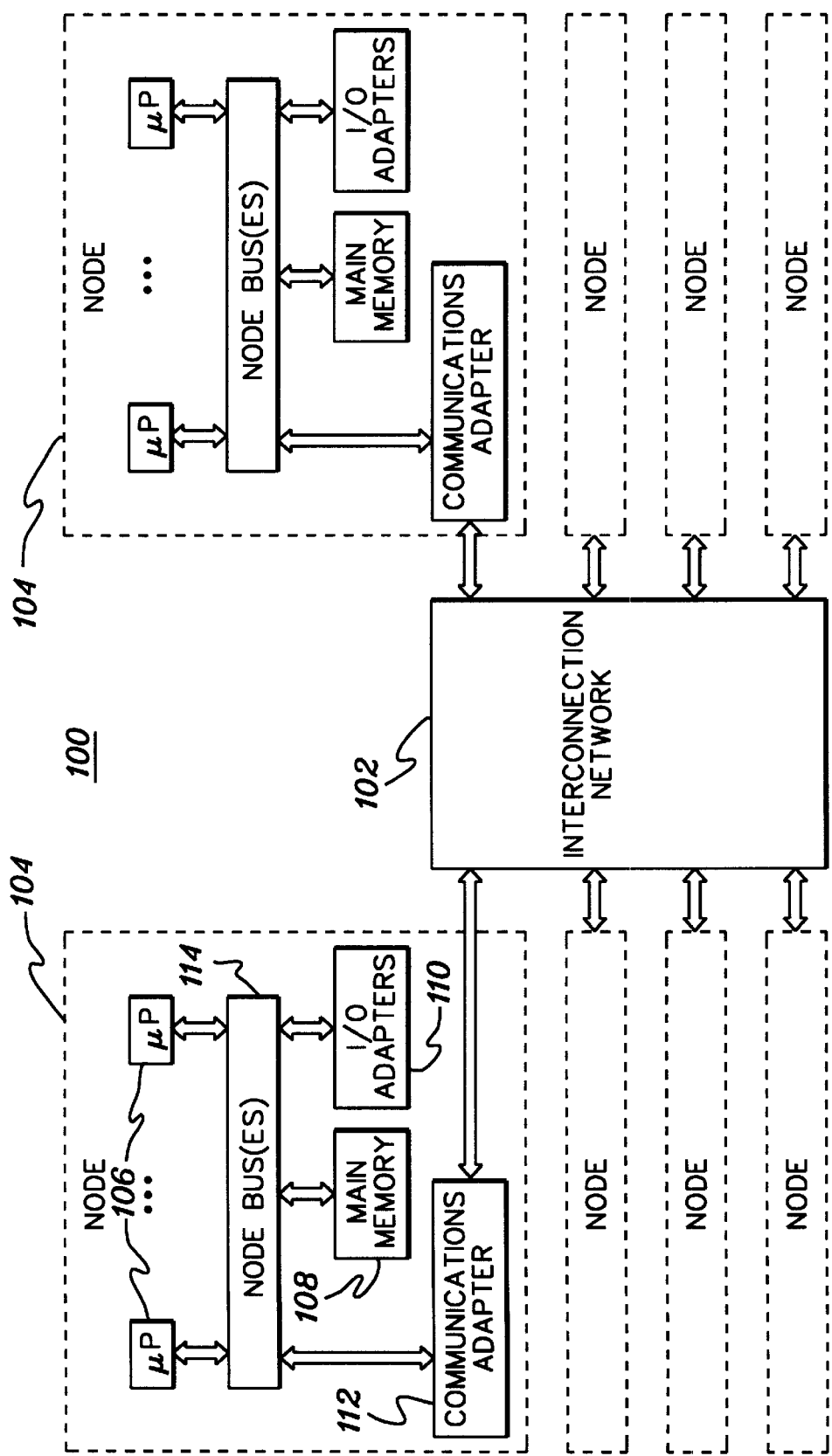
FIG. 1 depicts one example of a computer environment incorporating and using the capabilities of the present invention.

One example of a computer environment incorporating and using the simultaneous queueing capabilities of the present invention is depicted in FIG. 1 and described in detail herein. In one example, a computer environment 100 includes an interconnection network 102 used to couple a plurality of nodes 104 to one another. The interconnection network and nodes are described in further detail below.

Interconnection network 102 is, for instance, a high-performance switching network, which may include a number of switch chips. The switch chips are cross-bar, packet switching chips, interconnected to form a multi-stage interconnection network, as is known in the art. One example of an interconnection network is the Scalable Parallel ("SP") Switch, offered by International Business Machines Corporation.

Interconnection network 102 is used to couple at least some of the plurality of nodes 104 of computer environment 100 to one another. The nodes are independent of one another and each includes its own operating system, such as the Advanced Interactive Executive ("AIX") operating system offered by International Business Machines Corporation. Each node can be a sender and/or a receiver of messages. One example of a node is an RS/6000 workstation offered by International Business Machines Corporation.

In one example, a node includes one or more microprocessors 106, a main memory 108, one or more input/output (I/O) adapters 110, and a communications adapter 112, each of which is described in detail below.

Microprocessors 106 are capable of working in parallel with one another and are coupled to one another via one or more node buses 114. The microprocessors are further coupled to main memory 108, I/O adapters 110, and communications adapter 112 via node bus(es) 114.

As is known, main memory 108 stores information and/or programs to be used by the microprocessors. A node can include multiple main memories for storing such information and programs. Additionally, a node can store information and/or programs on external storage devices (such as disks), which are accessible to the node via I/O adapter(s) 110. The I/O adapters are also capable of communicating to other local area networks, as is known in the art.

Figure 2:
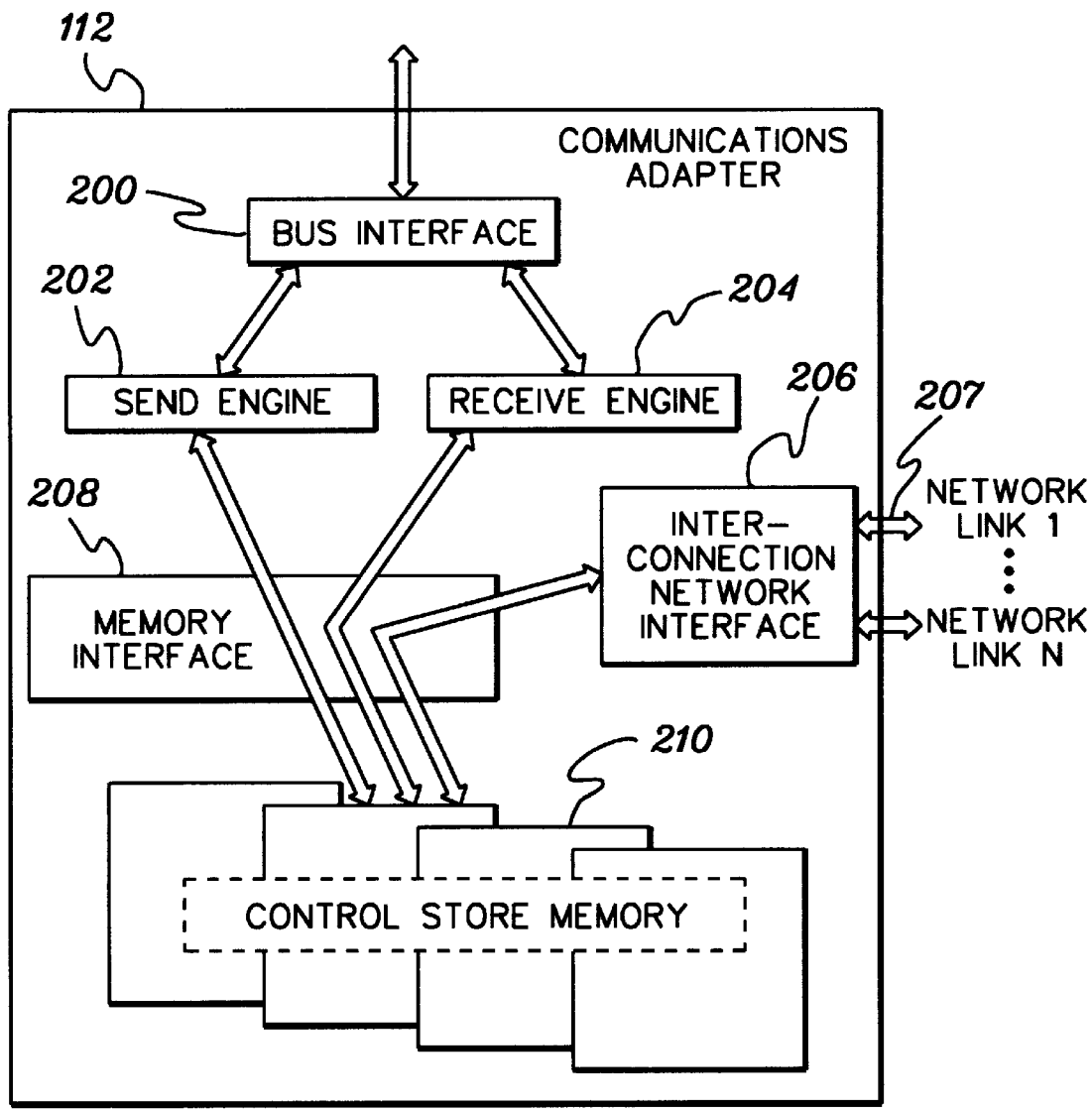
FIG. 2 depicts one example of a communications adapter within a node of the computer environment of FIG. 1, in accordance with the principles of the present invention.

Communications adapter 112 communicates with the microprocessor(s) via node bus(es) 114, and includes the components used for the simultaneous queueing capabilities of the present invention, as described in further detail herein. Referring to FIG. 2, in one example, communications adapter 112 includes a bus interface 200, a send engine 202, a receive engine 204, an interconnection network interface 206, a memory interface 208 and a control store memory 210, each of which is described in detail below.

Bus interface 200 couples communications adapter 112 with node bus(es) 114, thereby allowing the microprocessors to communicate with the communications adapter, and specifically, with the particular components of the communications adapter.

Bus interface 200 is further coupled to send engine 202. In one embodiment, send engine 202 includes one or more hardware state machines used in linking message descriptors to one or more queues, as described in further detail below. Likewise, bus interface 200 is coupled to receive engine 204, which also includes one or more hardware state machines used in receiving acknowledgements and moving message descriptors from one queue to another queue, as described in further detail below.

Interconnection network interface 206 also includes one or more hardware state machines, which is used to couple the communications adapter to interconnection network 102 (FIG. 1) via one or more network links 207 (FIG. 2). In particular, interface 206 includes one or more ports that physically connect to the one or more network links. In one embodiment of the invention, only one network link is used. In accordance with the principles of the present invention, the interconnection network interface is used to send messages and to move message descriptors from one queue to another queue, as described in further detail below.

As is known, the different state machines of the communications adapter can communicate with one another through signals sent from the state machines. However, the state machines can also communicate with one another through memory interface 208. In particular, the memory interface enables the state machines to interface with a shared bank of memory, i.e., shared control store memory 210. Thus, send engine 202, receive engine 204 and interconnection network interface 206 use memory interface 208 to store, update, and/or retrieve shared information located within control store memory 210.

Figure 3A:
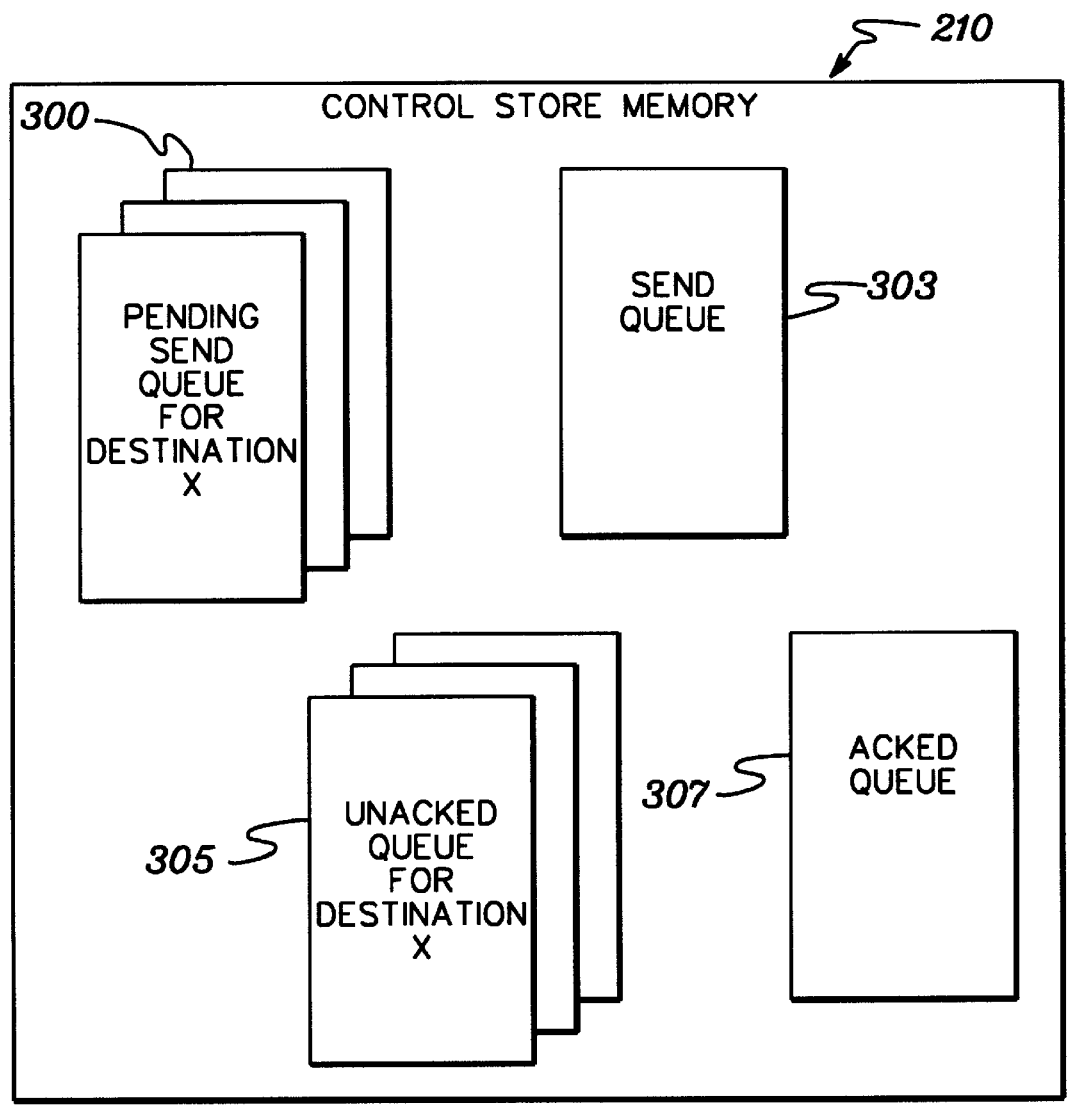
FIG. 3a depicts one example of the various queues stored within a control store memory located within the communications adapter of FIG. 2 and used in accordance with the principles of the present invention.

Control store memory 210 includes, for instance, various data structures that can be shared among the various components of the communications adapter. In one example, memory 210 includes the following queues used during the transmission of a message from a sender to a receiver (see FIG. 3a):

(a) A pending send queue 300, which includes message descriptors (described below) for any messages that cannot be sent from a sender to a particular receiver, since the receiver does not have enough buffer space to receive the message. In one example, there is one pending send queue for each destination node (i.e., receiver) that can possibly receive a message from the sender. For instance, if a sender is capable of sending a message to 100 destination nodes, then there would be 100 pending send queues within control store memory 210 of the sender node.

(b) A send queue 303, which includes message descriptors for those messages that are ready to be sent from the sender to one or more receivers (i.e., receivers that have enough buffer space to receive the message). In one example, there is one send queue in the sender, even if there are multiple destination nodes. The number of send queues is not related to the number of destination nodes, but is associated with the number of utilized network links. For instance, there is one send queue per network link. Thus, if only one network link is being utilized, then there is only one send queue.

(c) An unacknowledged queue 305, which includes message descriptors for those messages that have been sent from the sender to a particular receiver, but have not been acknowledged by the receiver, as of yet. In one example, there is one unacknowledged queue for each destination node (i.e., receiver) of the sender; and (d) An acknowledged queue 307, which includes message descriptors for those messages that have been acknowledged by any receiver capable of receiving messages from the sender. In one example, each sender has one acknowledged queue.

Figure 3B:
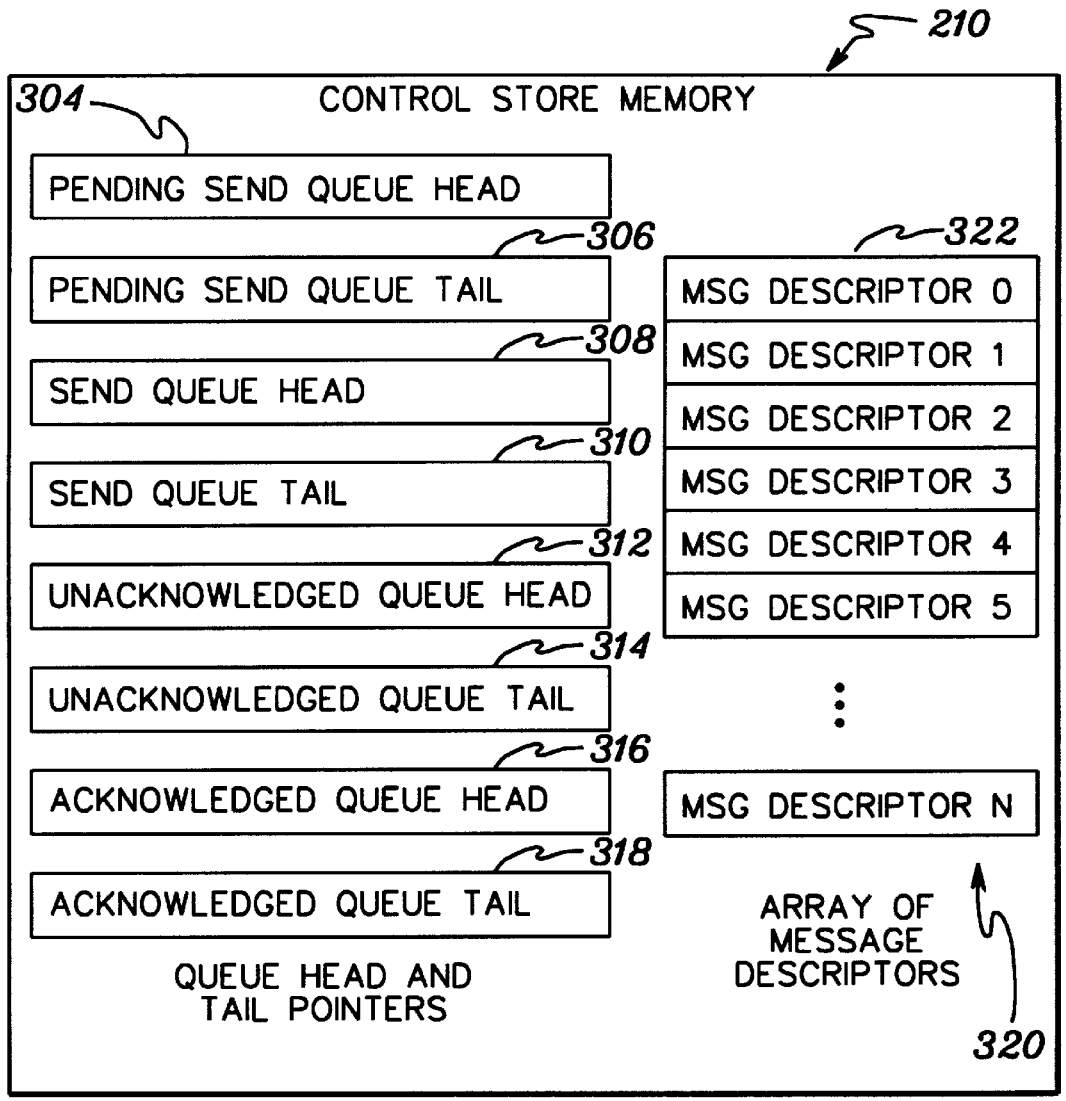
FIG. 3b depicts one embodiment of data structures located within the control store memory of FIG. 3a, used in accordance with the principles of the present invention.

In one example, each of the above-described queues is a linked list maintained by head and tail pointers. The head and tail pointers are stored and updated within control store memory 210. In one embodiment, control store memory 210 includes a pair of head and tail pointers for each of the queues. As shown in FIG. 3b, there is a pending send queue head pointer 304 and a pending send queue tail pointer 306 for each of the pending send queues (however, only one pair is shown here for clarity); a send queue head pointer 308 and a send queue tail pointer 310 for the send queue (there would be multiple pairs, if there were multiple send queues); an unacknowledged queue head pointer 312 and an unacknowledged queue tail pointer 314 for each of the unacknowledged queues (again, only one pair is depicted for clarity); and an acknowledged queue head pointer 316 and an acknowledged queue tail pointer 318 for the acknowledged queue. As is known, each of the head pointers indicates the first entry on its respective queue and each of the tail pointers indicates the last entry on its respective queue.

Figure 4:
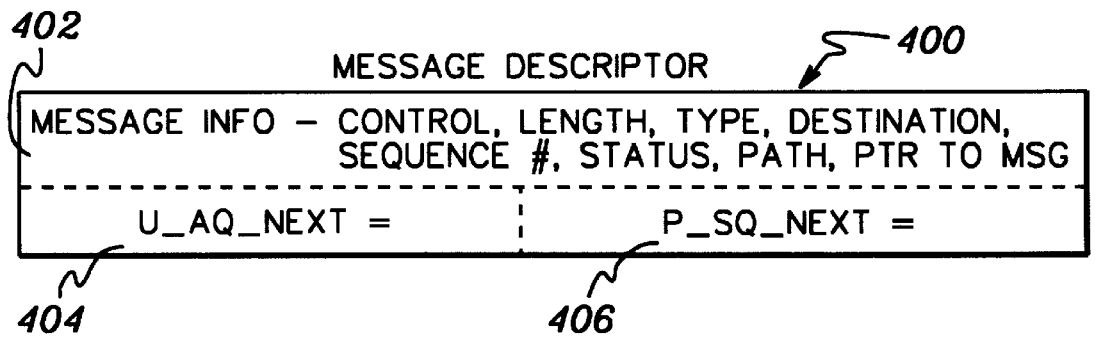
FIG. 4 depicts one example of the components of a message descriptor located in one of the data structures of FIG. 3b, in accordance with the principles of the present invention.

In addition to the queue head and tail pointers, control store memory 210 includes an array of message descriptors 320. This array includes a message descriptor 322 for each active message associated with a particular sender, regardless of its destination. Each message descriptor includes various information about its associated message, and one example of a message descriptor is depicted in FIG. 4 and described in detail below.

In one instance, a message descriptor 400 includes various information 402 regarding the message, including the following:

(a) A control field including a number of flags or bits providing information about the message. For instance, within the control field is a bit that indicates whether or not the intended recipient of the message should be interrupted for the message; a bit that indicates whether the message is an operating system message or an user application message; and a bit that indicates whether the message is a resend message (i.e., a copy of a previously transmitted message). Additional, less and/or different information can also be included within the control field without departing from the spirit of the present invention;

(b) A length field indicating the length of the message;

(c) A type field indicating the type of the message (e.g., control, data, tag, pull request, each of which is known in the art);

(d) A destination field indicating which node is to receive the message;

(e) A sequence number indicating the order of the message in relation to other messages for that particular destination;

(f) A status field indicating at what point along the transmission path the message can be found (e.g., pending, sent, waiting, unacknowledged, acknowledged);

(g) A path field indicating which path within the network the message is to take in order to arrive at its destination. For example, in one embodiment, there are four possible paths that a message can take. These four paths are included in a route table, which contains, for instance, four paths to each destination. The path field indicates which of the four possible paths it is to take. In one embodiment, it is the host processor that identifies the path to take by storing that information in the descriptor; and (h) A pointer to the message identifying the location within the control store memory of the message data. Alternatively, if the message is relatively small (e.g., 64 bytes or less), this field can include the actual data for the message, instead of a pointer to the data.

In addition to the above, in accordance with the principles of the present invention, message descriptor 400 also includes two independent linking pointers, an U_AQ_NEXT pointer 404 and a P_SQ_NEXT pointer 406. These pointers are used to link the message descriptor (and thus, the message) on the aforementioned queues. For example, the U_AQ_NEXT pointer includes an identification of the next message descriptor on either the unacknowledged queue or the acknowledged queue, as described below; and the P_SQ NEXT pointer includes an identification of the next message descriptor on either the pending send queue or the send queue, also described in further detail below.

The message descriptor can also include additional, less or different information than that described above, without departing from the spirit of the present invention.

In the embodiment described herein, it is the queue head and tail pointers, as well as the linking pointers of the descriptors, that define each queue. That is, descriptors are placed on or removed from a queue by manipulating the pointers. No descriptors are physically stored on the queues, and thus, the queues can be referred to as logical queues. However, in another embodiment, descriptors may be stored on the queues.

Figure 5A:
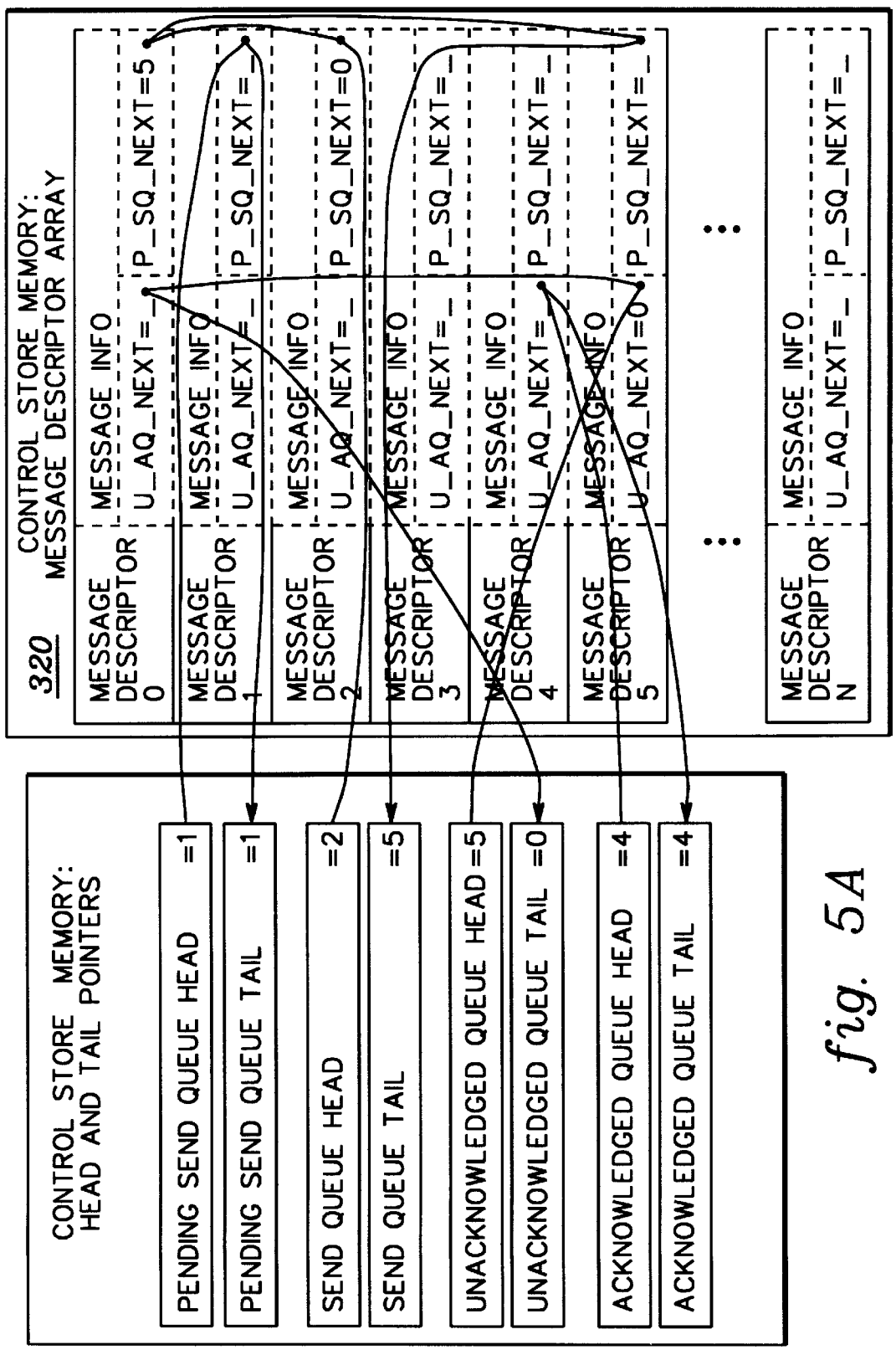
FIG. 5a depicts further details of the data structures of FIG. 3b, in accordance with the principles of the present invention.

One embodiment of how the dual linking pointers are used, in accordance with the principles of the present invention, is depicted in FIG. 5a and described in detail herein. In the example shown in FIG. 5a, it is assumed that the destination for all the messages is the same, and thus, only one pending send queue and one unacknowledged queue are depicted and described.

Figure 5B:
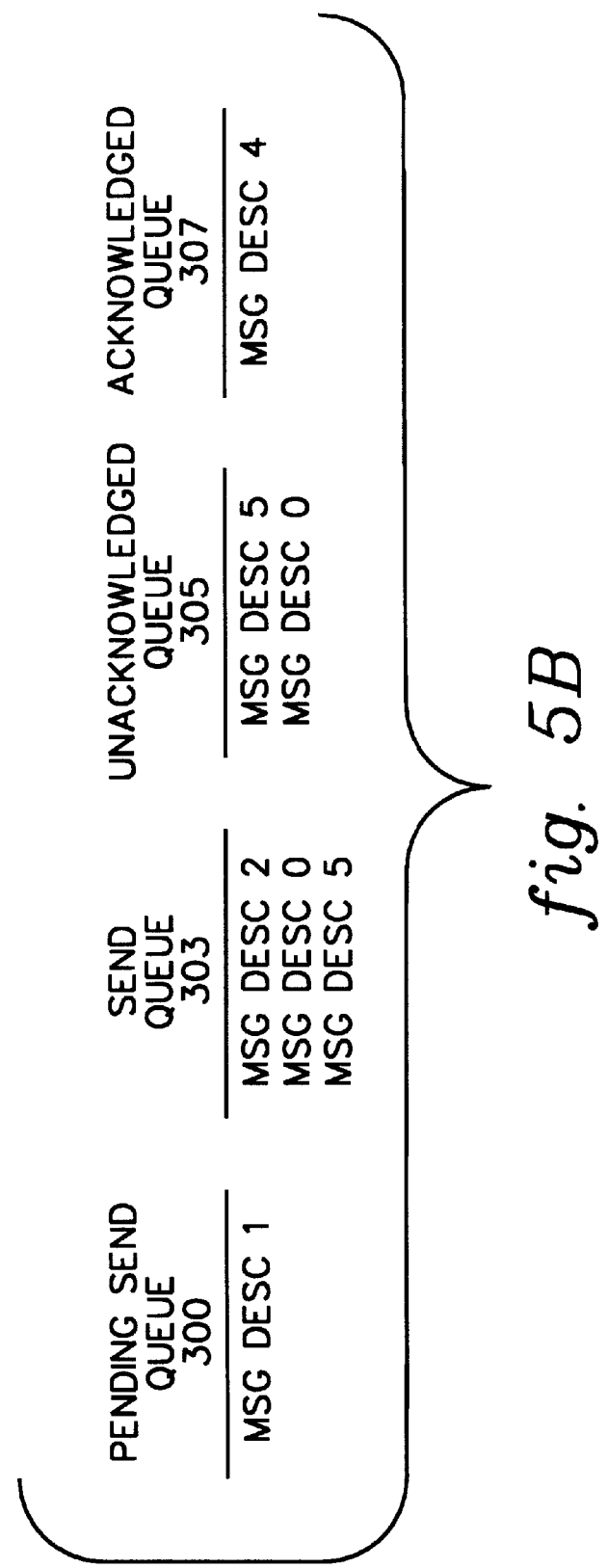
FIG. 5b logically depicts one example of message descriptors queued on the various queues of FIG. 3a, in accordance with the principles of the present invention.

Referring to FIG. 5a, the pending send queue head pointer is equal to a value of 1 indicating that Message Descriptor 1 is located on the pending send queue. In order to determine which, if any, other message descriptors are on the pending send queue, the P_SQ_NEXT pointer within Message Descriptor 1 is examined. In this particular instance, it is null indicating that no other message descriptors are located on the pending send queue (see FIG. 5b for a logical depiction of the descriptors of each queue). This is confirmed by the pending send queue tail pointer, which is set to the same value as the pending send queue head pointer (i.e., 1).

Additionally, the send queue head pointer is equal to 2 indicating that Message Descriptor 2 is on the send queue. By looking at Message Descriptor 2, and in particular, the P_SQ_NEXT pointer within that descriptor, it can be determined that Message Descriptor 0 is also on the send queue (i.e., P_SQ_NEXT=0). Similarly, by examining P_SQ_NEXT within Message Descriptor 0, it is determined that Message Descriptor 5 is also on the queue. Further, by viewing P_SQ_NEXT within Message Descriptor 5, it is determined that no other message descriptors are on the send queue (i.e., P_SQ_NEXT=null). Again, this is confirmed by observing that the send queue tail pointer is set to five.

The pointers for the unacknowledged and acknowledged queues work in a similar fashion. However, instead of using the P_SQ_NEXT pointer to determine the message sequence on either the unacknowledged or acknowledged queue, the U_AQ_NEXT pointer is employed. For example, for the unacknowledged queue, the queue head pointer is equal to 5 indicating that Message Descriptor 5 is also on the unacknowledged queue. Further, U_AQ_NEXT within Message Descriptor 5 is equal to 0 indicating that Message Descriptor 0 is also on the unacknowledged queue (see FIG. 5b). However, U_AQ_NEXT within Message Descriptor 0 is equal to null, and therefore, there are no further message descriptors on the unacknowledged queue.

The pointers for the acknowledged queue work in the same manner as that described above for the unacknowledged queue.

In accordance with the principles of the present invention, when a message is to be sent from a sender to a receiver, the message descriptor corresponding to that message is moved from one queue to another queue depending on its status of transmission. It is the dual, independent pointers within the message descriptor (i.e., U_AQ_NEXT and P_SQ_NEXT) that are used, in accordance with the invention, to link the message descriptor on the appropriate queues.

one embodiment of the logic used in transmitting a message from a sender to a particular receiver, including the queueing of the message descriptor, is described in detail with reference to FIGS. 6a–6b. It is noted that the transmission sequencing and the flow logic are described on a node pair basis (i.e., one defined sender to one defined receiver).

Figure 6A:
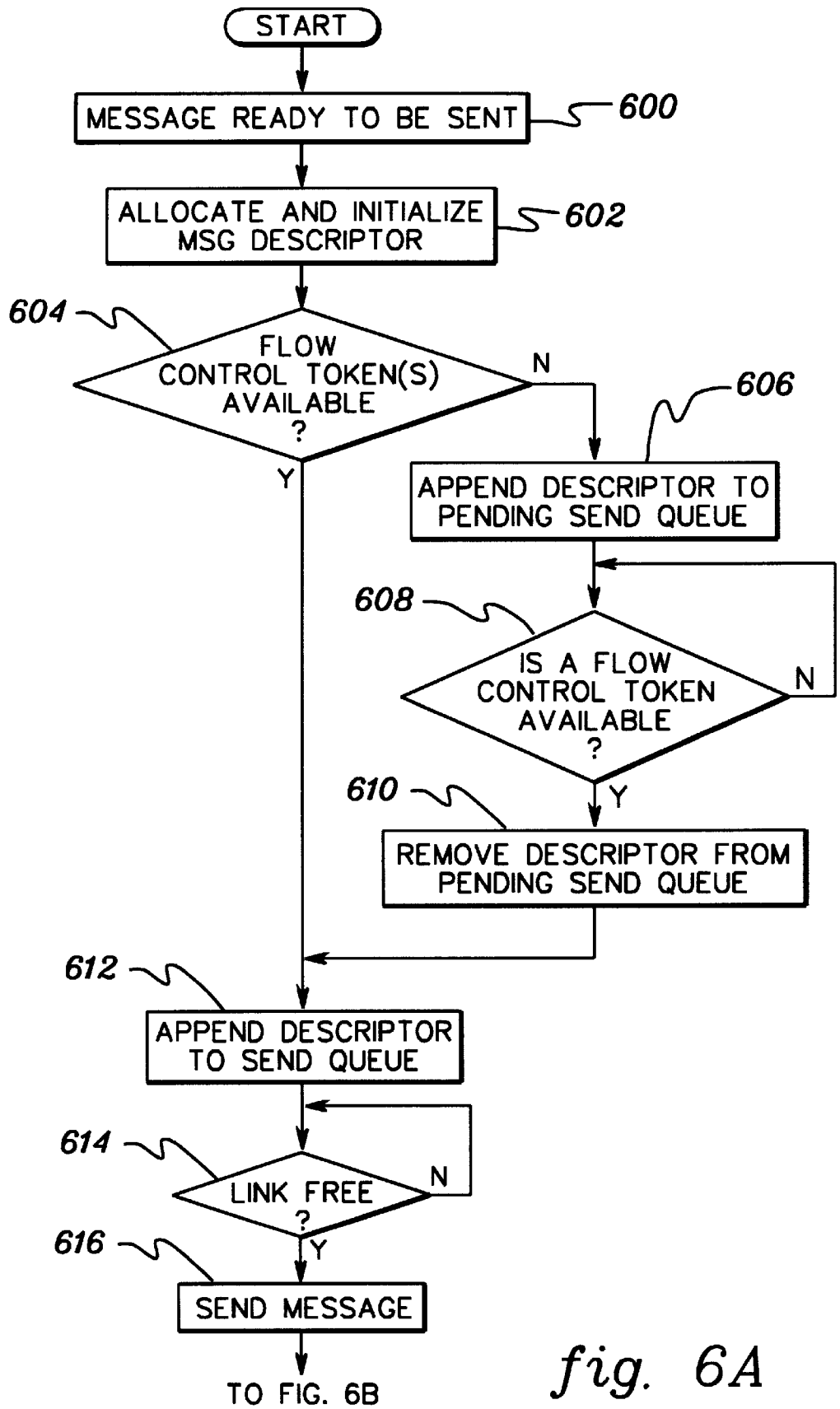
FIGS. 6a–6b depict one embodiment of the logic used to send a message within the computer environment of FIG. 1, in accordance with the principles of the present invention.

Referring to FIG. 6a, initially, one of nodes 104 (e.g., a sender) decides to send a message to another of the nodes (e.g., a receiver); thus, the sender prepares the message to be sent, STEP 600. For example, a microprocessor within one of the nodes sends a message request to its communications adapter indicating that a message is to be sent to a particular destination node.

Thereafter, a message descriptor is allocated and initialized for the message, STEP 602. In particular, the requesting microprocessor within the sending node examines a free list of available message descriptors to select the next available message descriptor. Once it has found an available message descriptor, the send engine of that node initializes message information fields 402 (FIG. 4) using information obtained from the microprocessor. For example, the send engine fills in the destination field from the information obtained from the microprocessor. The other fields are also completed in a similar manner. The initialized message descriptor is stored as an element of array of message descriptors 320 (FIG. 3b).

Subsequent to initializing the message descriptor for the message, a determination is made as to whether a flow control token is available for the destined receiver, INQUIRY 604. For example, if the receiver has enough buffer space ready to receive a message, it will send a flow control token (e.g., a small packet) to the sender via the interconnection network indicating space is available. However, if space is not available, then no token is sent.

When no flow control tokens are available, the message descriptor is appended to the destination's pending send queue 300 located within control store memory 210, STEP 606. Specifically, the send engine adds the descriptor to the end of the pending send queue by updating the pointers, as appropriate. For example, if Message Descriptor 1 is to be added to the pending send queue and no other message descriptors are currently stored therein, then the pending send queue head is set to one, as well as the pending send queue tail. Additionally, P_SQ_NEXT within Message Descriptor 1 is set to null, since at this time, no other entries are next on the pending send queue. Further, since there is only one entry on the queue, at this time, there is no P_SQ_NEXT pointer of a previous message descriptor to be updated. In one embodiment, the updating of the queue pointers and the P_SQ_NEXT pointer is performed atomically, such that no other operations on the pending send queue or within Message Descriptor 1 are performed until the appropriate pointers are updated.

Thereafter, a further determination is made as to whether a flow control token has become available, INQUIRY 608. For example, if the receiver has acknowledged one or more previous messages, then the buffer would have additional space. Thus, in one example, the return of an acknowledgement for a previous message also serves as the return of a flow control token.

If the receiver has not sent a token to the sender indicating that a buffer has been cleared, then the determination is made later again at a predetermined time interval. However, if a token has been sent to the sender, then the message descriptor is removed from the pending send queue, STEP 610. In one example, it is the receive engine of the sending node that removes the descriptor from the pending send queue. The descriptor is removed by, for instance, updating the pointers (e.g., head, tail and/or P_SQ_NEXT pointers), as appropriate. For example, if Message Descriptor 1 is the only descriptor on the pending send queue, then the head and tail pointers are both set to null, as well as P_SQ_NEXT within Message Descriptor 1.

After removing the descriptor from the pending send queue, the receive engine places it on the send queue located within control store memory 210, STEP 612. Alternatively, if a flow control token is available at INQUIRY 604, the message descriptor is not placed on the pending send queue, but, instead, appended directly to the send queue, STEP 612. In this scenario, it is, for instance, the send engine that appends the descriptor to the send queue. In either case, the descriptor is appended to the send queue by updating the send queue head and/or tail pointers, as appropriate, and updating the P_SQ_NEXT pointer of the message descriptor immediately preceding the newly added descriptor, if any, as described above. For example, if Message Descriptor 3 was added to the send queue depicted in FIG. 5b, then the send queue head pointer would remain the same (=2), the send queue tail pointer would be set to 3, and P_SQ_NEXT of Message Descriptor 5 would be set to 3. P_SQ_NEXT of Message Descriptor 3 would be null.

Next, a determination is made as to whether the specified network link is free, such that the message can be sent from the sender to the receiver through the interconnection network, INQUIRY 614. In one example, interconnection network interface 206 (FIG. 2) communicates with interconnection network 102 (FIG. 1), in a known manner, to determine if the link is free. When the link is not free, then this determination is made again at a predetermined time interval. However, when the link is free, then the message is sent, STEP 616.

The message is sent from the sender to the designated receiver via the interconnection network interface of the sender. In particular, the interface sends the message to the destination using the information (e.g., the path) stored in the message descriptor.

Figure 6B:
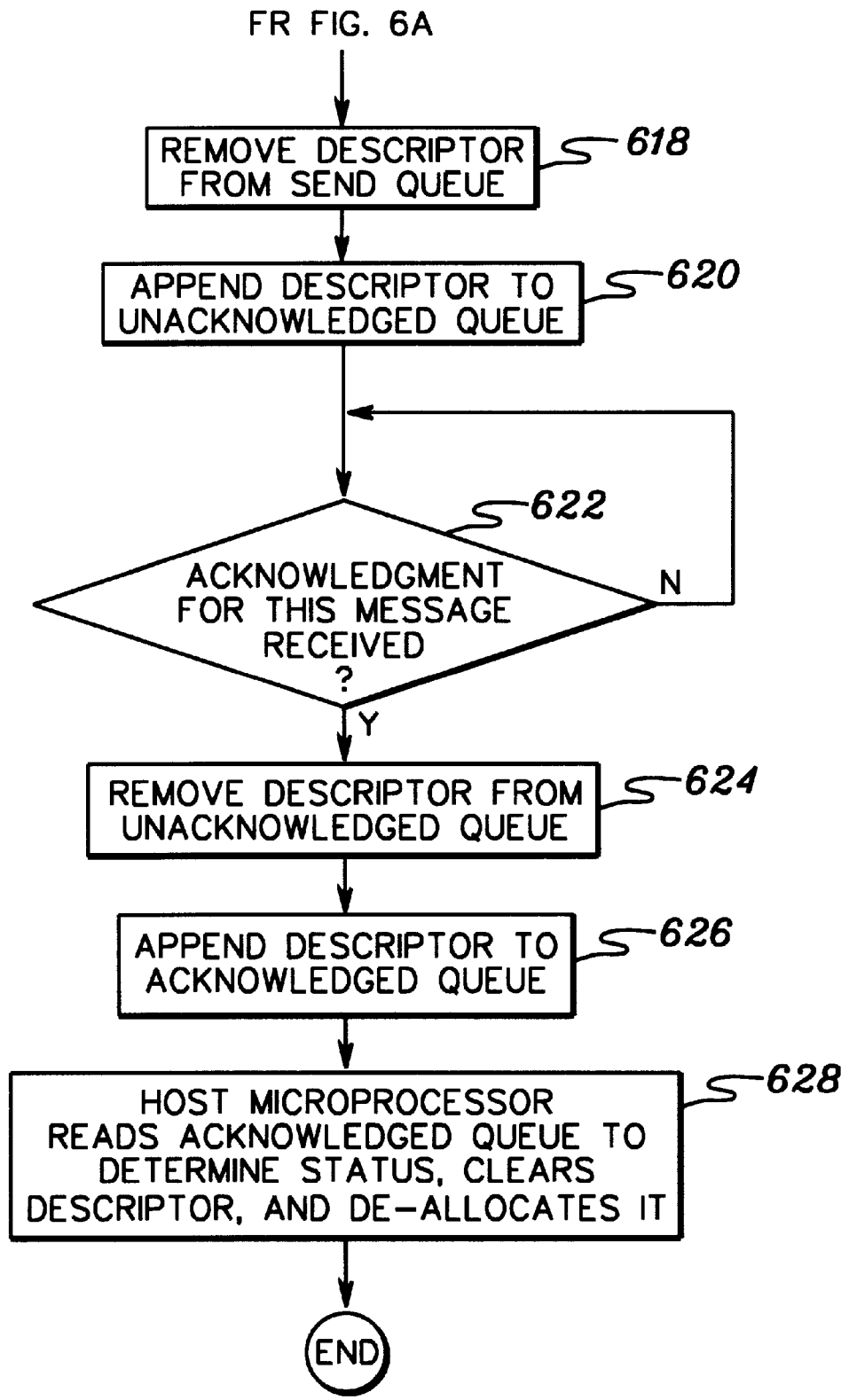

Once the message is sent (i.e., transmission of the message has begun), the message descriptor is removed from the send queue, STEP 618 (FIG. 6b). For example, the interconnection network interface deletes the descriptor from the send queue by adjusting the send queue head and/or tail pointers, as appropriate, and updating the appropriate P_SQ_NEXT pointer. Additionally, it appends the descriptor to the unacknowledged queue, in a similar manner, STEP 620. For example, the head and/or tail pointers of the unacknowledged queue are updated, as appropriate, as well as the U_AQ_NEXT pointer of the immediately preceding message descriptor, if any.

Next, a determination is made as to whether the receive engine of the sender has received an acknowledgement for the message, INQUIRY 622. In particular, when the receiver receives the message, it sends an acknowledgement of that receipt back to the sender via the same path in which the message was sent. If an acknowledgement has not been received, then this determination is made later again at a predetermined time interval. However, when the acknowledgement is received, the descriptor is removed from the unacknowledged queue and placed on the acknowledged queue, STEPS 624, 626, in a manner similar to that described above. In one example, it is the receive engine of the sender that moves the message descriptor from the unacknowledged queue to the acknowledged queue.

Subsequent to moving the descriptor to the acknowledged queue, the host microprocessor (i.e., the initiator of the message) reads the acknowledged queue to determine the status of the message, STEP 628. In particular, if the message is on the acknowledged queue, then the fields within the message descriptor are cleared and the message descriptor is deallocated (i.e., added back to the free list for further use by another message).

In the embodiment described above, retransmission of a message is not required. However, with reference to FIG. 7, an embodiment of the invention is described in which retransmission of a message is required. As with FIGS. 6a–6b, this logic is for a particular node pair. Duplicate of this logic would be used, in one embodiment, for other node pairs.

In accordance with the principles of the present invention, when retransmission is required, one of the linking pointers within the message descriptor (e.g., P_SQ_NEXT) is used to link the retransmitted message to the send queue, while the other linking pointer (e.g., U_AQ_NEXT) is used to maintain the originally transmitted message on the unacknowledged queue. Specifically, P_SQ_NEXT is used in adding the message descriptor back on the send queue, while U_AQ_NEXT is used to keep the message descriptor in its present order on the unacknowledged queue. The same message descriptor is used for the resent message, as for the original message (e.g., if Message Descriptor 5 is used for the original message, it is also used for the resent message). No new message descriptor is created or initialized for the resent message. This mechanism of dually linking message descriptors onto independent queues achieves correct sequentiality and preserves ordering of message transmission, even when messages are sent multiple times.

Figure 7:
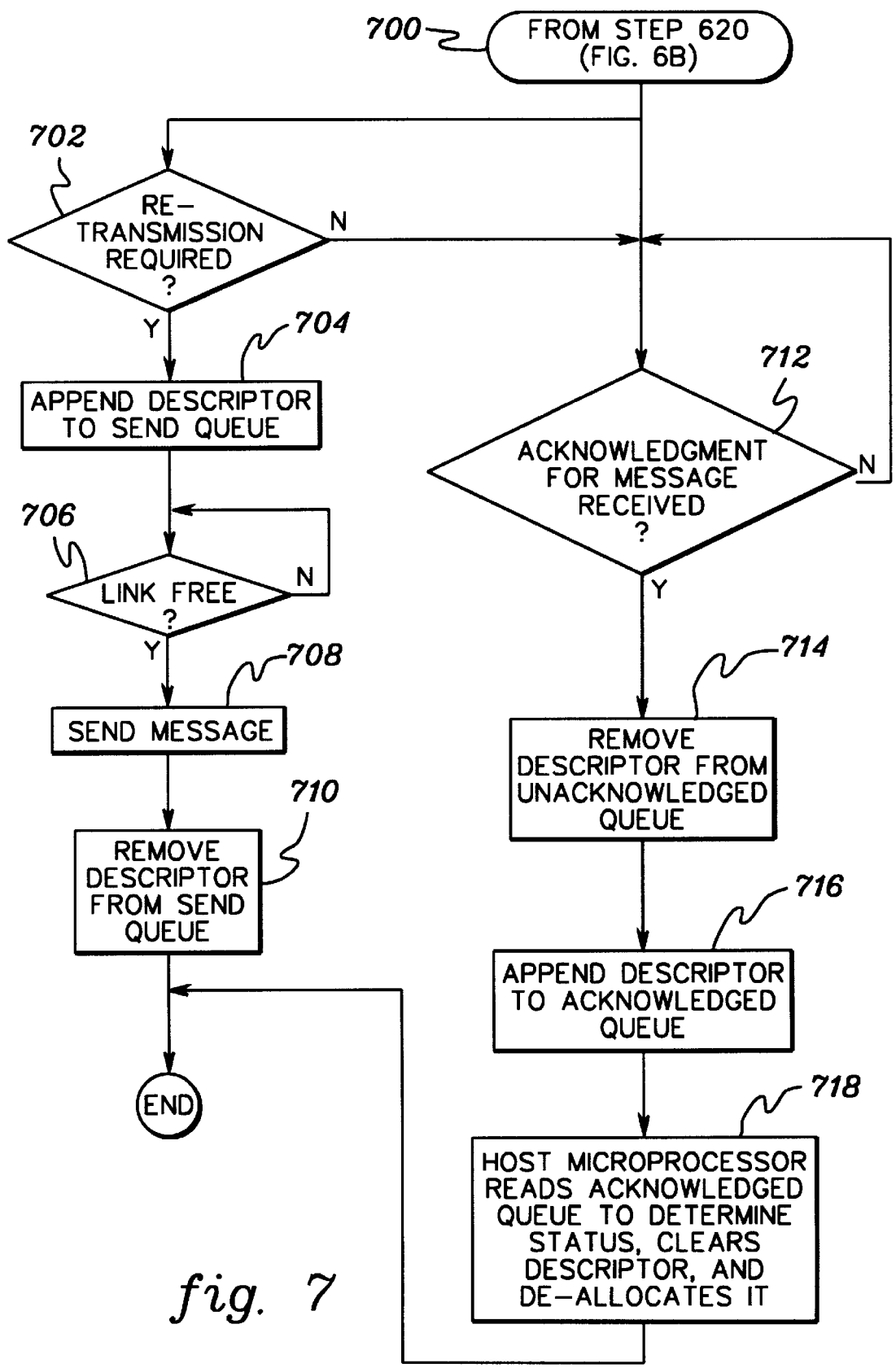
FIG. 7 depicts one embodiment of the logic used to resend a message within the computer environment of FIG. 1, in accordance with the principles of the present invention.

Referring to FIG. 7, it is noted that the logic commences from STEP 620 "APPEND DESCRIPTOR TO UNACKNOWLEDGED QUEUE" of FIG. 6b, STEP 700 (FIG. 7).

Specifically, each of the operations described above with reference to FIGS. 6a–6b up to and including STEP 620 occurs, as described above. However, in this embodiment, after the message descriptor is appended to the unacknowledged queue, two paths may be taken. Each of these paths can be executed in parallel. In one path, a determination is made as to whether retransmission of the message is required, INQUIRY 702. In one example, retransmission is required when the receive engine of the sender has not received from the receiver within a certain period of time an acknowledgement indicating receipt of the message.

When retransmission is required, one of the control bits within the message descriptor is set to indicate this is a resend message (i.e., a duplicate message), and then the message descriptor is appended to the send queue, in the manner described above, STEP 704. Thereafter, a determination is made as to whether the link is free, INQUIRY 706. When the link is free, the message is sent, STEP 708, and the descriptor is removed from the send queue, STEP 710, as described above. In accordance with the principles of the present invention, the message descriptor does not have to be placed on the unacknowledged queue again, since the descriptor is already there. That is, the descriptor has not been removed from the unacknowledged queue and therefore, its order on the queue is maintained.

Returning to INQUIRY 702, if retransmission is not required, at this time, then, control passes to INQUIRY 712. INQUIRY 712 is also the start of the second path. At INQUIRY 712, a determination is made as to whether an acknowledgement has been received for the message. If an acknowledgement has not been received, then the inquiry is made again at a preselected time interval. Further, if after a certain period of time, no acknowledgement has been received, then the flow can proceed once again to STEP 702 "RETRANSMISSION REQUIRED?".

However, if an acknowledgement has been received, then the message descriptor for the original message is removed from the unacknowledged queue and appended to the acknowledged queue, as describe above, STEPS 714, 716. Thereafter, the host microprocessor reads the acknowledged queue to determine if the acknowledgement is there, STEP 718. If so, it clears the fields of the descriptor and deallocates it.

Described above is a simultaneous queueing capability in which two independent linking pointers in a message descriptor are used to preserve ordering of message transmission even when messages are sent multiple times. The capability of the present invention allows a higher level, faster, and more pipelined message recovery with lower overhead.

In one aspect of the present invention, various hardware engines and interfaces are used to perform the capabilities and functions of the present invention. For example, the send engine attaches message descriptors to either the pending send queue or the send queue; the receive engine receives acknowledgements, and moves message descriptors from the unacknowledged queue to the acknowledged queue. Further, it moves message descriptors from the pending send queue to the send queue, if necessary; and the interconnection network interface sends messages, and moves the message descriptors from the send queue to the unacknowledged queue. These engines and interfaces are capable of operating concurrently and simultaneously. For example, the send engine of a sending node may be attaching descriptors to the pending send queue or the send queue at the same time (or substantially the same time) that the receive engine is receiving acknowledgements for other messages already sent and/or the interconnection network interface is sending messages.

In another embodiment of the present invention, other, additional or less hardware elements than that described above can be used to implement the present invention. Further, the invention can be implemented in software. These variations are considered within the scope of the claimed invention.

The embodiment described above is only one example. In another embodiment, the invention can be used and/or incorporated within other computer environments. For instance, the nodes need not be RS/6000 workstations. They can be any computers, processors, workstations, systems and/or any combination therebetween in which message transmission is utilized. Further, the operating system need not be AIX and the nodes need not have microprocessors. The above is only one example.

Further, as described above, one pending send queue is used for each destination, one send queue is used for each network link, one unacknowledged queue is used for each destination and there is only one acknowledged queue. Again, this is only one example. Variations to the number of queues used can be employed without departing from the spirit of the present invention. Further, data structures other than queues can be used to implement the present invention.

In accordance with the principles of the present invention, the state machines of the communications adapter, used in accordance with the present invention, can be included on one chip or multiple chips.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of sending messages within a computer environment, said system comprising:
   a sender of said computer environment being adapted to send a message to a receiver of said computer environment, said sender comprising:
      at least one hardware element being adapted to remove a descriptor of said message from a first data structure using a first pointer of said descriptor, and to append said descriptor to a second data structure using a second pointer of said descriptor, said first and second pointers being independent of one another.

2. The system of claim 1, wherein said at least one hardware element is adapted to append by being further adapted to:
   set said second pointer of said descriptor to null indicating said descriptor is currently the last element of said second data structure; and
   update said second pointer of a previous descriptor appended to said second data structure, if said previous descriptor exists, to reflect that said descriptor being appended is the next linked element to said previous descriptor.

3. The system of claim 1, wherein said sender is further adapted to receive an acknowledgement from said receiver indicating receipt of said message.

4. The system of claim 3, wherein said sender comprises at least one hardware element used in receiving said acknowledgement, said at least one hardware element being adapted to remove said descriptor from said second data structure and to append said descriptor to a third data structure using said second pointer.

5. The system of claim 4, wherein said first data structure comprises one or more descriptors capable of being received by said receiver, said second data structure comprises one or more descriptors that has been sent to said receiver, but not acknowledged by said receiver, and said third data structure comprises one or more descriptors that has been acknowledged by said receiver.

6. The system of claim 1, wherein said sender is further adapted to resend said message from said sender to said receiver, wherein said resend comprises appending said descriptor to said first data structure using said first pointer, such that said descriptor also remains on said second data structure and ordering of said descriptor on said second data structure is maintained.

7. The system of claim 6, wherein said sender is further adapted to remove said descriptor from said first data structure, after said message is resent.

8. The system of claim 6, wherein said sender is further adapted to remove said descriptor from said second data structure when receipt of said message is acknowledged by said receiver.

9. The system of claim 8, wherein said sender is further adapted to append said descriptor to a third data structure using said second pointer, after said descriptor is removed from said second data structure.

10. The system of claim 1, wherein said sender is further adapted to append said descriptor, using said first pointer, to a pending send data structure prior to sending said message, when said receiver is incapable of receiving said message.

11. The system of claim 10, wherein said sender is further adapted to remove said descriptor, using said first pointer, from said pending send data structure and to append said descriptor to said first data structure, when said receiver is capable of receiving said message.

12. A system of queueing messages within a computer environment, said system comprising:
   a first pointer of a message descriptor adapted to link said message descriptor to a first data structure; and
   a second pointer of said message descriptor adapted to link said message descriptor to a second data structure, wherein said first and second pointers are independent of one another and wherein said message descriptor is appended to both said first data structure and said second data structure for a certain amount of time.

13. The system of claim 12, wherein linking of said message descriptor to said second data structure indicates receipt of a message corresponding to said message descriptor is to be acknowledged, and wherein linking of said message descriptor to said first data structure indicates retransmission of said message is required.

14. The system of claim 12, further comprising means for removing said message descriptor from said first data structure after retransmission of said message and means for removing said message descriptor from said second data structure after receipt of said message by said receiver is acknowledged.

15. A memory comprising a descriptor stored in said memory for use in sending messages, said descriptor comprising:

a first pointer usable in linking a message on one of a first data structure and a second data structure; and a second pointer usable in linking said message on one of a third data structure and a fourth data structure, wherein said second pointer is usable to preserve ordering of message transmission.

* * * * *